United States Patent
Hellwege et al.

(10) Patent No.: US 9,976,574 B2
(45) Date of Patent: May 22, 2018

(54) DUAL BELLOWS SEPARATOR FOR HIGH PRESSURE APPLICATIONS

(71) Applicant: Technetics Group, LLC, Charlotte, NC (US)

(72) Inventors: Nathan Hellwege, Daytona Beach, FL (US); Aaron Glafenhein, Daytona Beach, FL (US); James White, Daytona Beach, FL (US)

(73) Assignee: TECHNETICS GROUP LLC, Charlotte, NC (US)

( * ) Notice: Subject to any disclaimer, the term of this patent is extended or adjusted under 35 U.S.C. 154(b) by 100 days.

(21) Appl. No.: 14/888,684

(22) PCT Filed: May 15, 2014

(86) PCT No.: PCT/US2014/038064
§ 371 (c)(1),
(2) Date: Nov. 2, 2015

(87) PCT Pub. No.: WO2014/186503
PCT Pub. Date: Nov. 20, 2014

(65) Prior Publication Data
US 2016/0061224 A1   Mar. 3, 2016

Related U.S. Application Data

(60) Provisional application No. 61/823,796, filed on May 15, 2013.

(51) Int. Cl.
*F15B 1/04*  (2006.01)
*F15B 1/10*  (2006.01)
(Continued)

(52) U.S. Cl.
CPC ............. *F15B 1/103* (2013.01); *B64G 1/402* (2013.01); *F02M 63/02* (2013.01); *F15B 2201/3153* (2013.01); *F15B 2201/32* (2013.01)

(58) Field of Classification Search
CPC ............. F15B 1/103; F15B 2011/3153; F15B 2201/3154; F15B 2201/32; F15B 2201/3153

See application file for complete search history.

(56) References Cited

U.S. PATENT DOCUMENTS 3,336,948 A   8/1967 Rene
3,424,202 A   1/1969 Lincicome
(Continued)

FOREIGN PATENT DOCUMENTS

EP   2226512 A1   9/2010
JP   H01124401    8/1989

OTHER PUBLICATIONS

Notification of Transmittal of The International Search Report and The Written Opinion of The International Searching Authority, or The Declaration for PCT/US2014/038064 issued by ISA/US dated Sep. 25, 2014, 8 pages.

*Primary Examiner* — F. Daniel Lopez
(74) *Attorney, Agent, or Firm* — Perkins Coie LLP

(57) ABSTRACT

A high pressure separator/accumulator that uses dual bellows is provided. The dual bellows are not mechanically linked but rather operationally coupled through a fluid medium. The high pressure separators includes a housing defining a first internal space. The housing is in fluid communication with a first fluid system and a second fluid system. A first bellows is coupled to the interior of the separator and defines a space with a variable volume. The space is in fluid communication with the first fluid system. A second bellows is coupled to the interior of the separator, generally opposed to the first bellows, and defines a space with a variable volume. The space is in fluid communication with the second fluid system. The two fluid systems, however, are isolated from each other by the separator. The
(Continued)

housing is charged with a fluid medium that transmits force between the first and second bellows.

<div align="center">9 Claims, 4 Drawing Sheets</div>

(51) Int. Cl.
  *F02M 63/02* (2006.01)
  *B64G 1/40* (2006.01)

(56) <div align="center">References Cited</div>

<div align="center">U.S. PATENT DOCUMENTS</div>

| | | | |
|---|---|---|---|
| 3,783,905 | A | 1/1974 | Simister |
| 3,918,498 | A | 11/1975 | Schneider |
| 4,239,267 | A | 12/1980 | Hudson |
| 5,944,217 | A * | 8/1999 | Baena ............... F15B 1/086 220/551 |
| 6,189,572 | B1 | 2/2001 | Ruffer et al. |
| 6,345,963 | B1 | 2/2002 | Thomin et al. |
| 6,412,476 | B1 | 7/2002 | Thompson et al. |
| 7,984,764 | B2 | 7/2011 | Leonardi et al. |
| 8,002,041 | B2 | 8/2011 | Leonardi et al. |
| 8,439,080 | B2 * | 5/2013 | Uusipaikka ......... E21B 33/0385 138/26 |
| 2003/0178076 | A1 | 9/2003 | Suzuki |
| 2004/0056530 | A1 | 3/2004 | Yuda et al. |
| 2005/0155658 | A1 | 7/2005 | White |
| 2012/0216900 | A1 | 8/2012 | Liermann et al. |
| 2012/0241009 | A1 | 9/2012 | Reid |

* cited by examiner

DUAL BELLOWS SEPARATOR FOR HIGH PRESSURE APPLICATIONS

CROSS-REFERENCE TO RELATED APPLICATION(S)

The present application claims the benefit of and priority to U.S. Provisional Patent Application Ser. No. 61/823,796, filed May 15, 2013, the disclosure of which is incorporated herein as if set out in full.

BACKGROUND

Fluid systems are ubiquitous in many industrial markets. Often these systems have pressures and/or temperatures that vary. One device useful in offsetting the expansion and contraction of fluid systems are metallic bellows accumulators. The metallic bellows accumulators allow fluid to ingress or egress to maintain a system pressure, especially in systems that experience temperature changes. For example, as temperature rises, the density of most fluids decreases causing the fluid volume to expand at a given pressure, which is generally known as Boyle's law. When temperature falls, the density of most fluids increases causing the fluid volume to contract at a given pressure. The bellows accumulators allow systems to expand and contract when temperature changes occur in a closed fluid system.

A cross sectional view of a prior art accumulator 100 is shown in FIGS. 1A and 1B. In FIG. 1A, the accumulator 100 is shown in the expanded state 102. The accumulator 100 in this construction has a housing 104 or outer shell defining a first space 106 and a bellows 108 have an end plate 109 defining a second space 110. The first space 106 is at a desired pressure and temperature. The first space 106 may be in fluid communication with a first fluid port 112 that regulates the pressure and/or temperature of the first space 106. The bellows 108 may be, for example, a welded bellows in which a number of individually formed diaphragms 114 are welded to each other along welds 116 or a formed bellows where a cylindrical tube is cold formed into a bellows. The housing 104 may be unnecessary in situations where the first space 106 is maintained at atmospheric pressures and temperatures. The second space 110 is in fluid communication with a system through a second fluid port 118. The second space 110 is generally filled with the fluid (gas or liquid). In the expanded state, as shown, the pressure of the second space 110 is greater than the pressure of the first space 106 causing the expansion of bellows 108. As can be appreciated, either of the first fluid port 112 or the second fluid port 118 can be in fluid communication with the fluid system or the regulated pressure source.

As shown in FIG. 1B, the accumulator 100 is shown in the compressed state 120. In this state, the bellows 108 is compressed, which reduces the volume of the second space 110 and increases the volume of the first space 106, which may have the effect of decreasing the pressure of the first space 106 if first space 106 is not in communication with a pressure regulation system as described above.

As the pressures in the first and second space 106, 110 change, the bellows 108 moves from a more expanded state to a more compressed state. The maximum pressure differentials occur at the compressed state 120 and the fully expanded state 102.

The bellows 108 is capable of withstanding very high pressure differentials in the compressed state 120 as the stacked bellows support each other through contact and limit the amount of deflection. The bellows 108 in the expanded state, however, are susceptible to failure. In particular, the thin metal of the bellows and the welds limit the maximum differential pressures the bellows 108 can withstand in the fully extended state as the individual diaphragms 114 do not provide significant support to adjacent diaphragms.

High pressure bellows separators, however, are desirable despite the maximum differential pressures that the bellows can withstand. Thus, a need exists in the industry for a high pressure bellows separator that can withstand significant differential pressures in the expanded state. Thus, against this background, an improved high pressure bellows separator is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technology described herein provides, among other things, a high pressure separator/accumulator that uses dual bellows. The dual bellows are not mechanically linked but rather operationally coupled through a fluid medium. In particular, the high pressure separators in certain aspects has a housing defining a first internal space. The housing is in fluid communication with a first fluid system and a second fluid system. A first bellows is coupled to the interior of the separator and defines a space with a variable volume. The space is in fluid communication with the first fluid system. A second bellows is coupled to the interior of the separator, generally opposed to the first bellows, and defines a space with a variable volume. The space is in fluid communication with the second fluid system. The two fluid systems, however, are isolated from each other by the separator. The housing is charged with a fluid medium that transmits force between the first and second bellows.

These and other aspects of the present system and method will be apparent after consideration of the Detailed Description and Figures herein.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to dual bellows separator usable in fluid systems where high differential pressures may make conventional bellows unacceptable. However, the technology of the present application would be useful in any separator application as the reduced pressure differential demands when the bellows are fully expanded provide decreased wear and fatigue on the bellows, which may increase life and decrease maintenance. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1A:
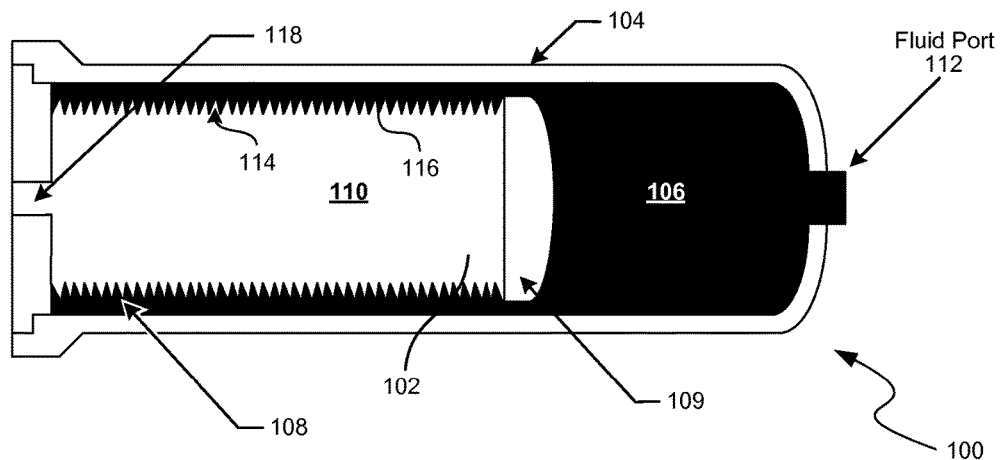
FIG. 1A consists of a cross sectional view of a metallic bellows accumulator consistent with the prior art in an expanded state.
Figure 1B:
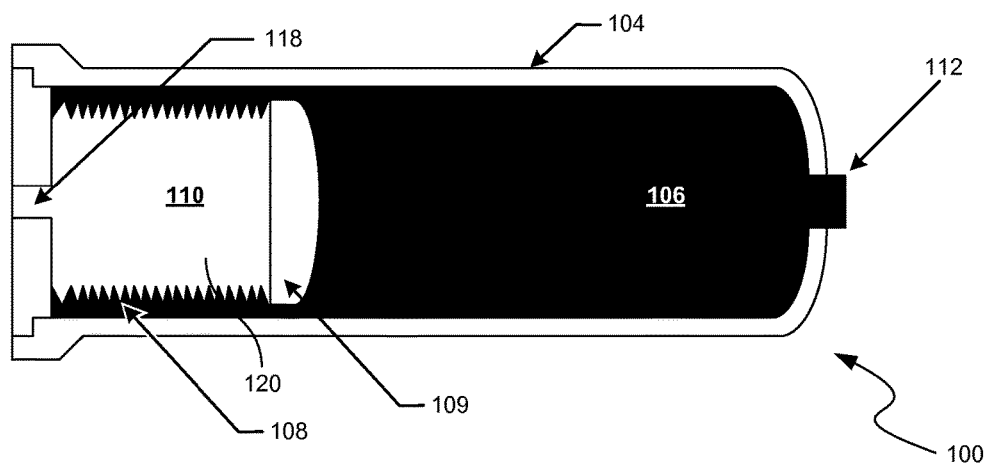
FIG. 1B consists of the cross sectional view of the metallic bellows accumulator of FIG. 1A in a compressed state.
Figure 2:
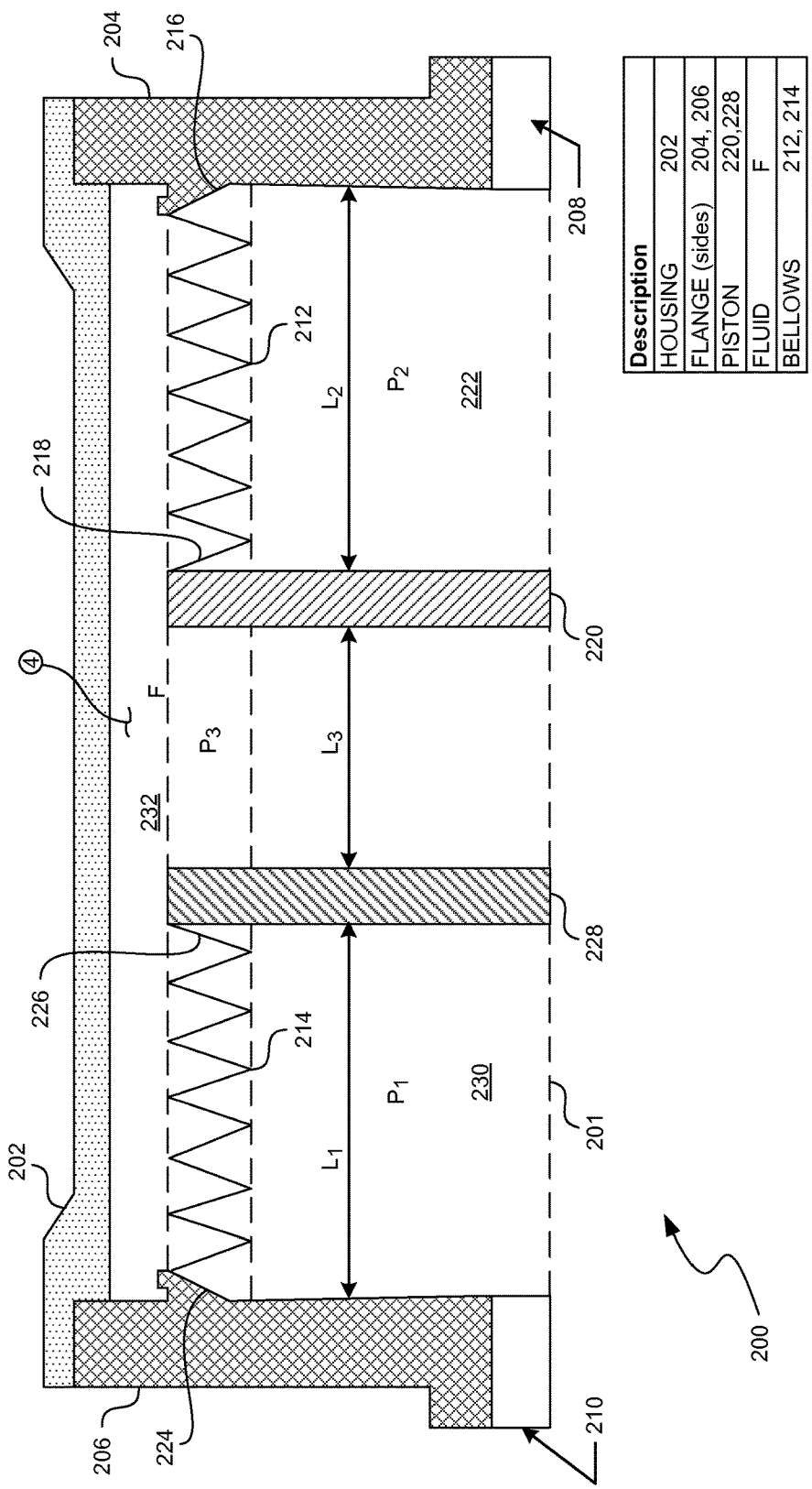
FIG. 2 consists of a partial cross sectional view of a dual metallic bellows accumulator consistent with the technology of the present application.
Figure 3:
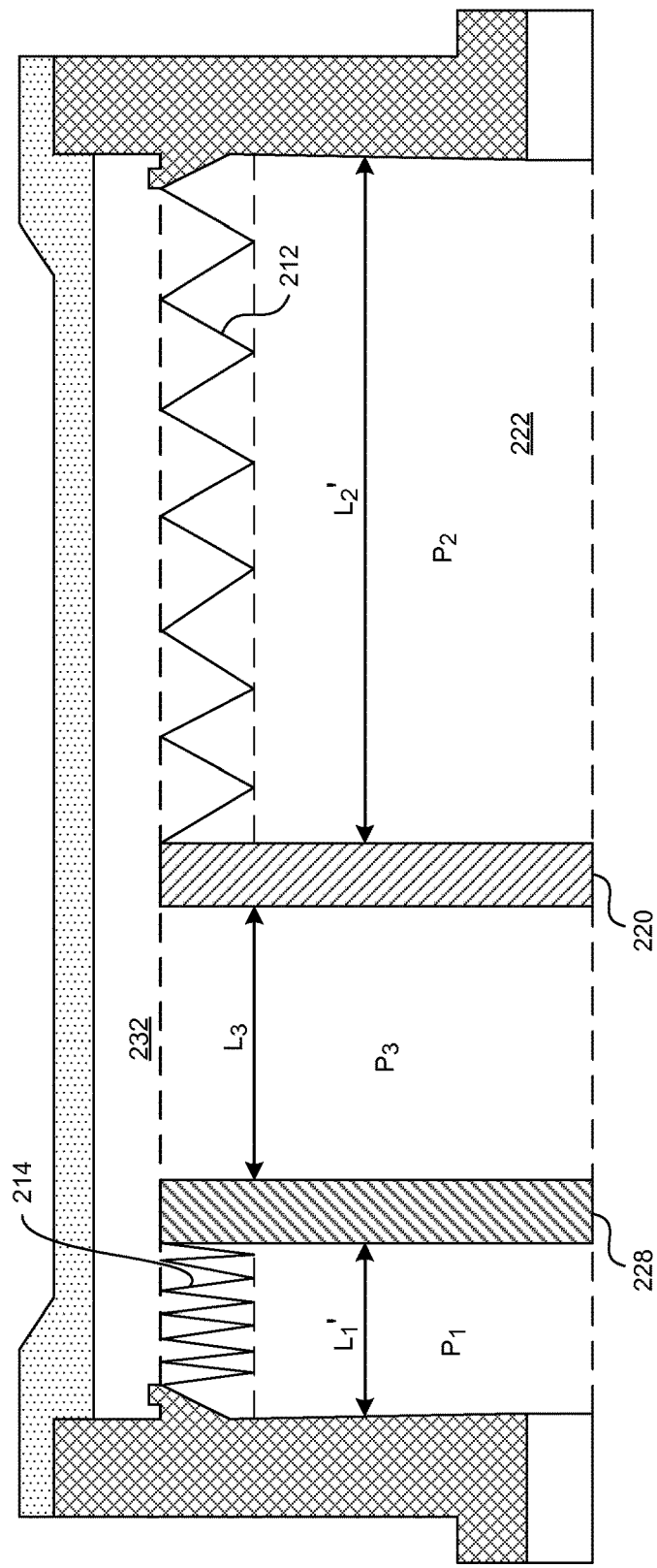
FIG. 3 consists of the partial cross sectional view of the dual metallic bellows accumulator of FIG. 2.

With reference now to FIGS. 2-3, a partial cross-sectional view of an accumulator 200 is provided. The cross section is taken along a center line 201 of the accumulator showing only ½ of cross section of the accumulator 200 for convenience. The accumulator 200 has a housing 202 with a system side 204 and a pressure control side 206. The accumulator 200 has a first port 208 on the system side 204 placing the accumulator 200 in fluid communication with a first fluid system, not shown for convenience, but generally known in the art. The accumulator 200 has a second port 210 on the pressure control side 206, which may be in fluid communication with a second fluid system (e.g. a fluid system having a regulated pressure source). The accumulator may initially be provided with the first and second fluid ports capped or sealed. For example, if the accumulator 200 was designed to inject fluid into a fluid system, the first and second ports may be sealed with a rupture disk of the like (not specifically shown). This allows the accumulator 200 to be charge with a fluid, installed into a system, and a motive force to be applied to one of the fluid ports.

The accumulator 200 has a first bellows 212 and a second bellows 214. In this exemplary embodiment, the bellows 212, 214 may comprise edge-welded metal bellows constructed from stainless steel, nickel alloys, titanium, titanium alloys, or the like. The first bellows 212 has a first proximal end 216 and a first distal end 218. The first proximal end is coupled to the housing 202 on the system side 204 of the accumulator 200. The first distal end terminates at a plate 220, which may be referred to as a piston. The first bellows 212 defines a first space 222 in fluid communication with the first port 208 and the fluid system such that the first space 222 is at approximately the same pressure as the fluid system, which is identified as P2. The second bellows 214 has a second proximal end 224 and a second distal end 226. The second proximal end 224 is coupled to the housing 202 on the pressure control side 206 of the accumulator 200. The second distal end 226 terminates at a plate 228, which also may be referred to as a piston. The second bellows 214 defines a second space 230 in fluid communication with the second port 210 and the regulated pressure source such that the second space 230 is at approximately the same pressure as the regulated pressure source, which is identified as P2.

The housing 202 of the accumulator 200 defines a third space 232 internal to the housing, but external of the first and second bellows 212, 214. The third space 232 is charged with a fluid F to a predetermined pressure, which is identified as P3. The fluid F may be a low thermal expansion liquid, such as, for example, silicone gel, hydraulic fluid, or the like.

With specific reference now to FIG. 2, the accumulator 200 is shown in a state of equilibrium. In other words, the pressure control and the fluid system pressures are approximately equal, which means $P1=P2\approx P3$. At or approximately at equilibrium, the bellows 212, 214 expand to their free length, shown by L1, L2. The plates 220, 228 are separated by the fluid F and a distance L3, which may be minimized for efficiency. Notably, while first bellows 212 and second bellows 214 are operably coupled by the fluid F, they are not mechanically linked. The free lengths L1 and L2 generally relate to the spring rates as they equalize.

With reference now to FIG. 3, the accumulator 200 is shown where P1<P2. As can be shown, in this case, the first bellows 212 expands such that L2'>L2. Correspondingly, the second bellows 214 collapses such that L1'<L1. Notably, the distance L3 between plates 220, 228 should remain approximately the same. The pressure differential between the fluid system and the regulated pressure source can be very great in this construction because the collapsed second bellows 214 can withstand a high differential pressure between spaces 230 and 232. While the second bellows 214 may experience a high differential pressure, the first bellows 212 is still at a relatively constant pressure such that the pressure $P2\approx P3$ such that in the expanded state, the first bellows 212 does not experience a similarly high differential pressure.

Figure 4:
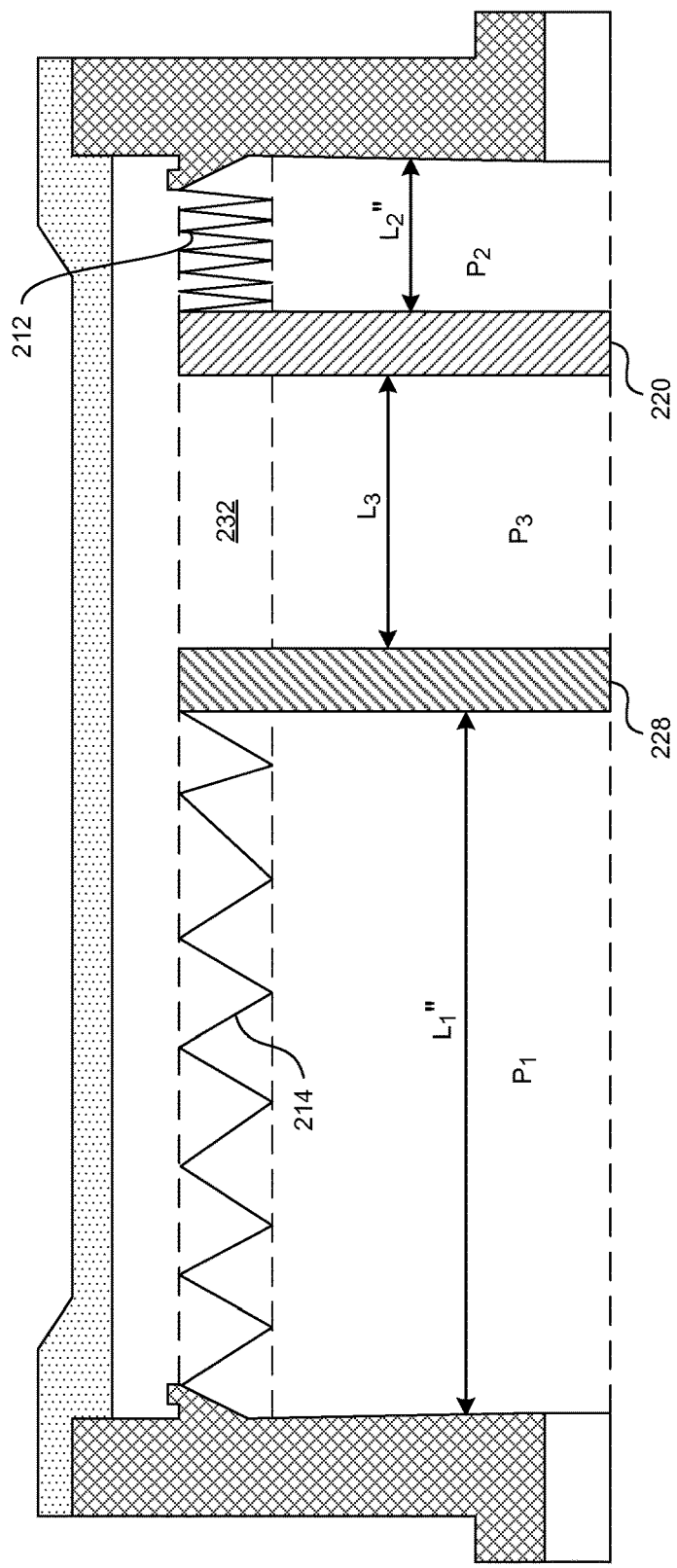
FIG. 4 consists of the partial cross sectional view of the dual metallic bellows accumulator of FIG. 2.

With reference now to FIG. 4, the accumulator 200 is shown where P2<P1. As can be shown, in this case, the first bellows 212 collapses such that L2"<L2. Correspondingly, the second bellows 214 expands such that L1">L1. Similarly to the above, the distance L3 between plates 220, 228 should remain approximately the same. The pressure differential between the fluid system and the regulated pressure source can be very great in this construction because the collapsed first bellows 212 can withstand a high differential pressure between spaces 222 and 232. While the first bellows 212 may experience a high differential pressure, the second bellows 214 is still at a relatively constant pressure such that the pressure $P1\approx P3$ such that in the expanded state, the second bellows 214 does not experience a similarly high differential pressure.

The accumulator 200 allows for systems where either the fluid system pressures are high and the regulated pressure source is low or the fluid system pressures are low and the regulated pressure source is high. Such fluid systems may include applications where hazardous fluids are involved.

In one exemplary application, the accumulator 200 may be useful to refuel satellites. Generally, moving a fluid, such as rocket fuel, from a storage, such as an accumulator, to the tanks of a satellite requires a motive force. In most applications, the motive force is a pump. However, most pumps use elastomer seals. Rocket fuel, however, is generally not compatible with most elastomers making most pumps unsatisfactory. The accumulator 200 solves this problem by providing a separation between the regulated pressure source, which may be in fluid communication with a pump discharge and the fluid system, which may be in fluid communication with the tanks. To facilitate, for example, a refueling operation, the accumulator 200 may have the first or second space 222, 230 charged with fuel. The metallic bellows contains the fuel and isolates the fuel from the pump. Other applications for accumulator 200 are of course possible in, for example, hydrocarbon fluid systems such as with pipelines and oil wells and derricks.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. An apparatus comprising:
   a housing defining a first internal space comprising a first side and a second side opposite the first side, the housing comprising a first port and a second port;
   a first bellows residing in the first internal space defining a second internal space and coupled to the first side of the housing, the second internal space in fluid communication with the first port and not in fluid communication with the first internal space;
   a second bellows residing in the first internal space defining a third internal space, and coupled to the second side of the housing, the third internal space in fluid communication with the second port and not in fluid communication with the first internal space, the second bellows operable and not mechanically coupled to the first bellows; and
   a fluid medium in the first internal space charged to a predefined pressure, the fluid medium mechanically separating the first bellows and the second bellows, the fluid medium transmitting force between the first and second bellows;
   wherein the fluid medium is a silicone gel.

2. The apparatus of claim 1 wherein the first bellows is a metal bellows.

3. The apparatus of claim 2 wherein the second bellows is a metal bellows.

4. The apparatus of claim 3 wherein the first bellows and the second bellows are formed of an identical material.

5. The apparatus of claim 1 wherein the first bellows is an edge welded metal bellows.

6. The apparatus of claim 5 wherein the second bellows is an edge welded metal bellows.

7. The apparatus of claim 1, further comprising a first plate positioned in the housing and coupled to the first bellow, wherein the first plate is welded to a first distal end of the first bellows.

8. The apparatus of claim 1, further comprising:
   a first plate positioned in the housing and coupled to the first bellows, and
   a second plate positioned in the housing and coupled to the second bellows,
   wherein the first plate is welded to a first distal end of the first bellows and the second plate is welded to a second distal end of the second bellows.

9. A method for manufacturing an apparatus, comprising:
   forming a housing having a center portion, a first side portion, and a second side portion, wherein the center portion defines a center axis, and wherein the first side portion includes a first port, and wherein the second side portion includes a second port;
   coupling the first side portion to a first bellows;
   coupling the first bellows to a first plate;
   positioning the first bellows and the first plate in the housing, wherein the first plate is positioned to move along the center axis;
   coupling the second side portion to a second bellows;
   coupling the second bellows to a second plate;
   positioning the second bellows and the second plate in the housing, wherein the second plate is positioned to move along the center axis;
   positioning a low-thermal expansion fluid medium in the housing between the first plate and the second plate, wherein the low-thermal expansion fluid medium is not in fluid communication with the first port and the second port, wherein the low-thermal expansion fluid medium is a silicone gel; and
   charging the low-thermal expansion fluid medium to a predefined pressure.

* * * * *